United States Patent [19]

Hamblin et al.

[11] Patent Number: 4,804,308

[45] Date of Patent: Feb. 14, 1989

[54] WHEELCHAIR LIFT

[75] Inventors: Peter Hamblin; George Schwarz, both of Winnipeg, Canada

[73] Assignee: Motor Coach Industries, Winnipeg, Canada

[21] Appl. No.: 5,055

[22] Filed: Jan. 20, 1987

[51] Int. Cl.[4] .............................................. B60P 1/44

[52] U.S. Cl. .................................... 414/540; 414/921; 414/537; 414/545

[58] Field of Search ................................ 414/537-540, 414/921, 495, 556, 571, 541, 545; 187/9 R, 6, 23, 51, 52, 8.59

[56] References Cited

U.S. PATENT DOCUMENTS

| | | | |
|---|---|---|---|
| 533,404 | 1/1895 | Youngson | 187/51 |
| 747,899 | 12/1903 | Wall | 187/9 R |
| 1,390,837 | 9/1921 | Stubbe | 187/9 R X |
| 1,406,942 | 2/1922 | Dean | 187/52 |
| 3,521,775 | 7/1970 | Vermette | 187/9 R X |
| 3,613,917 | 10/1971 | Fowler, Jr. | 414/540 |
| 3,918,596 | 11/1975 | Ward | 414/541 |
| 4,039,091 | 8/1977 | Adamski et al. | 414/556 |
| 4,071,152 | 1/1978 | Kinkead et al. | 414/541 |
| 4,083,429 | 4/1978 | Abbott | 187/9 R |
| 4,121,695 | 10/1978 | Carpenter | 414/539 |
| 4,278,389 | 7/1981 | Konkle | 414/540 |
| 4,407,623 | 10/1983 | Parks | 414/921 X |
| 4,557,353 | 12/1985 | Pichon | 187/6 X |
| 4,664,584 | 5/1987 | Braun et al. | 414/921 X |

FOREIGN PATENT DOCUMENTS

| | | | |
|---|---|---|---|
| 132561 | 10/1978 | German Democratic Rep. . | |
| 59029 | 2/1980 | Japan | 414/921 |
| 2106857 | 4/1983 | United Kingdom | 414/921 |
| 2140749 | 12/1984 | United Kingdom | 414/921 |

OTHER PUBLICATIONS

Motor Coach Industries, Inc., MC-9 Wheelchair Lift Operators Manual, Feb., 1986.

*Primary Examiner*—Robert J. Spar
*Assistant Examiner*—David A. Bucci
*Attorney, Agent, or Firm*—Bernard L. Howard; Richard G. Harrer

[57] ABSTRACT

A wheelchair lift for a vehicle in which the lift platform serves as part of the floor of the vehicle, and does not need to be extended outwardly of the vehicle to load or unload a wheelchair passenger. The lift operates within a shaft extending between the floor and the undercarriage of the vehicle, and sliding pulley panels are provided at two opposing sides of the shaft below the floor of the vehicle. Pulleys are mounted adjacent the top edges of the pulley panels, and chains are passed over the pulleys, and attached at one end to a fixed point on the vehicle at or below the midpoint between the floor of the vehicle and ground level, and attached at the other end to a lift platform. Other chains are attached at one end to the pulley panels and at the opposite end to a hydraulic cylinder, such that the pulley panels are lowered or raised as the hydraulic cylinder is retracted or extended, in turn causing the lift platform to traverse between the floor of the vehicle and ground level within the shaft. A ramp is hingedly attached to the edge of the lift platform adjacent the lift entrance, and is lowered to ground level when the lift is in its lowered position, to provide a bridge between ground level and the lift platform.

10 Claims, 6 Drawing Sheets

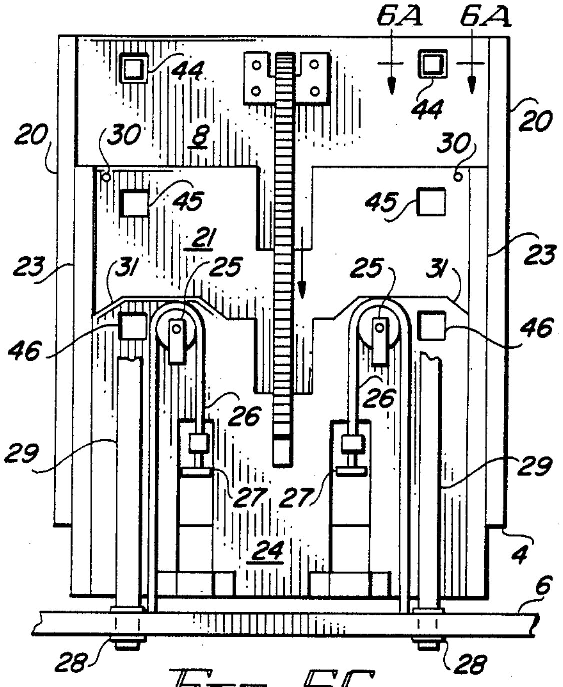
FIG-5C
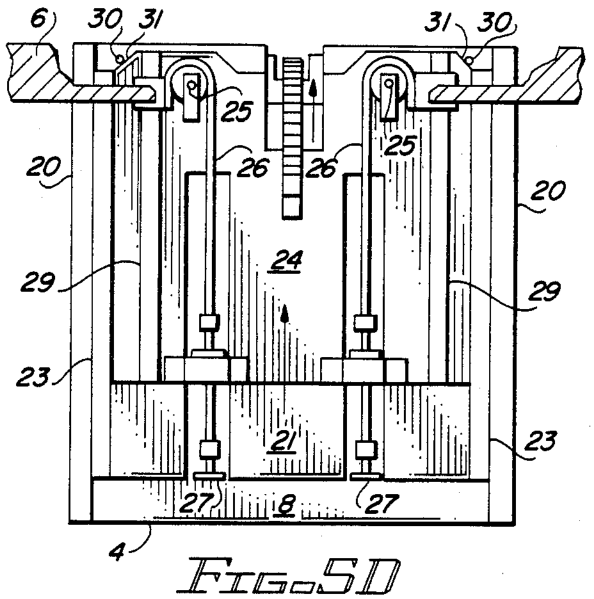
FIG-5D
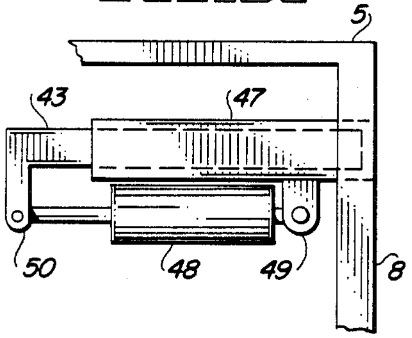
FIG-6A
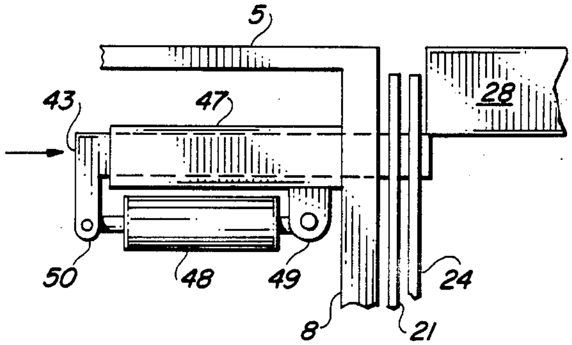
FIG-6B
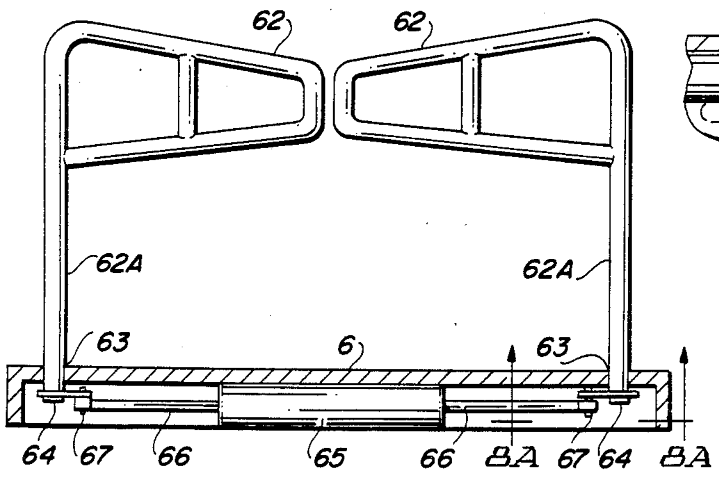
FIG-7
FIG-8A
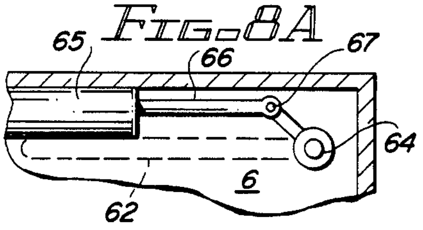
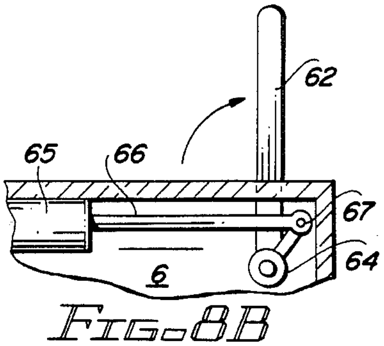
FIG-8B

WHEELCHAIR LIFT

BACKGROUND OF THE INVENTION

This invention relates to lifts or elevators in general, and to wheelchair lifts for vehicles in particular.

In recent years, our society has become more conscious of the needs of handicapped persons, and a need has been recognized for means allowing persons who use wheelchairs to easily and safely board a vehicle such as a van or a bus. The prior art includes many examples of lifts or elevators which can be used for this purpose.

Many prior art wheelchair lifts utilize a platform which is designed to be pivotally swung or otherwise extended outwardly of the side of the vehicle and lowered to the ground or raised to the passenger floor level as desired, to allow a wheelchair passenger to embark into or disembark from the vehicle. To stow the platform when the lift is not in use, the platform is typically pivotally swung into a generally vertical position or slid or folded into some type of stowage area so that the lift mechanism does not protrude from the side of the vehicle, and to permit the door of the vehicle to be closed. A disadvantage of this type of lift is that once the wheelchair passenger is lifted to the passenger floor level, it becomes necessary for such passenger to be moved off the platform and into the vehicle before the platform can be stowed and the vehicle operated, and for the platform to be deployed and the wheelchair passenger moved out of the vehicle and onto the platform before such passenger can be lowered to the ground. In addition, the wheelchair passenger is generally left suspended for a time on an open platform some distance from the ground, which may cause apprehension or vertigo in the wheelchair passenger or affect the wheelchair passenger's dignity; and may pose some safety problems as well.

Most of such prior art lifts also provide a supporting structure, an operating mechanism or both which impinge into the interior of the vehicle, thus taking up precious room and introducing undesirable noises inside the vehicle; and in some cases, exposing passengers to operating parts of the lift mechanism. It would therefore be desirable to provide a platform which forms part of the floor of the vehicle and is not required to be extended outwardly of the vehicle, thus adding to the mental and physical security and safety of wheelchair passengers; and which does not require moving the wheelchair passenger off the platform and stowing the platform before the vehicle can be operated, nor require that the platform be deployed and the wheelchair passenger moved onto the platform before the passenger can be lowered to the ground.

One prior art wheelchair lift, shown in the "MC-9 Wheelchair Lift Operators Manual", describes a wheelchair lift for a vehicle in which the lift platform forms part of the floor of the vehicle when the platform is in its raised position, which does not need to be extended outwardly of the vehicle before the lift can be used, and which does not require moving the wheelchair passenger off of or onto the platform for loading or unloading, or during operation of the vehicle. Said reference also shows that such lift is enclosed on three sides in an elevator-type shaft, which enhances the wheelchair passenger's feelings of mental security and dignity, and also provides greater physical safety. A disadvantage of this prior art lift is that it requires for its structure and operation platform stabilizers, hydraulic cylinders and other hydraulic components and controls which project to a significant degree into the interior of the vehicle above the passenger floor, and which require padding or shrouding for passenger safety and to provide visual and sound barriers around said components. Such components not only take up valuable room and create unwanted noises inside the vehicle, but also make it more difficult for wheelchair and other passengers to maneuver within the vehicle. Also, the presence of such components inside the vehicle makes it necessary to dedicate more space inside the vehicle to the wheelchair lift, which might otherwise be occupied by ordinary passenger seats which can be used by non-handicapped passengers. This is a particular problem for vehicles such as buses used for public transportation, and only occasionally used by wheelchair passengers. Further, the use of a plurality of hydraulic cylinders in said lift requires hydraulic circuitry, controls. valves, pumps, and a hydraulic fluid reservoir of appropriate size and complexity to serve the needs of such a system, adding weight thereto, taking up space that might be used for other purposes, and making the system more costly to build and maintain than a simpler system.

It would therefore be very desirable to provide a wheelchair lift for a vehicle which has a lift platform that serves as part of the floor of the vehicle in its raised position and does not need to be extended outwardly of the vehicle in order to load or unload a wheelchair passenger, which provides ample visual and physical barriers around the lift platform during operation of the lift for wheelchair passenger comfort and safety, and which eliminates above-floor lift structures or lift operating mechanisms to preserve maximum interior room and passenger seating flexibility in the vehicle, to remove objectionable noises from the passenger compartment, and to reduce or eliminate the safety problems presented by passenger exposure to operating parts of the lift mechanism. It would also be desirable to provide such a wheelchair lift with a minimum of hydraulic components to reduce the complexity of the system and to make the system easier to maintain and repair, to minimize the space taken up by such components, and to reduce the cost to produce the lift.

BRIEF SUMMARY OF THE INVENTION

The invention comprises a wheelchair lift for vehicles in which the lift platform serves as part of the floor of the vehicle, and does not need to be extended outwardly of the vehicle to load or unload a wheelchair passenger. The wheelchair lift does not require that the wheelchair passenger be moved off the platform and the platform stowed before operating the vehicle, nor require that the platform be deployed and the wheelchair passenger moved onto the platform before the passenger can be lowered to the ground. The invention also provides ample visual and physical barriers around the lift platform during operation of the lift, to provide for wheelchair passenger comfort and safety. Further, the invention eliminates above-floor intrusions by the lift structures or operating mechanisms, preserves a maximum amount of vehicle interior room, lend greater passenger seating flexibility, safely places the lift operating apparatus out of passenger reach, and isolates objectionable noises derived from the lift apparatus outside the passenger compartment. In addition, the invention requires a minimum of hydraulic components, thus reducing the cost to manufacture the lift, the complexity of the system, and making the system easier to maintain and repair.

In a particular embodiment a lift is provided having a platform for traversing between an upper level and a lower level; a pulley adapted to traverse between the upper level and the midpoint between the upper and lower levels; a cable passing over the pulley and attached at one end to a fixed point at or below the midpoint between the upper and lower levels and attached at its other end to the platform; and means for lowering and raising the pulley at its rotational axis to cause the platform to traverse between the upper and lower levels.

In another embodiment, a wheelchair lift for a vehicle having a floor with a cut-out portion adjacent an entrance is provided, having a platform adapted to fit within the cut-out in the floor for traversing between the floor and ground level; a pulley adapted to traverse between the floor of the vehicle and the midpoint between the floor and ground level; a cable passing over the pulley and attached at one end to a fixed point at or below the midpoint between the floor and ground level and attached at its other end to the platform; and means for lowering and raising the pulley at its rotational axis to cause the platform to traverse between the floor and ground level.

In a further embodiment a ramp is provided which is hingedly attached to the edge of the platform adjacent the vehicle entrance, and is adapted to be lowered while the platform is being lowered and adapted to be raised while the platform is being raised; the ramp having a ramp tip hingedly attached to its outer edge, which gradually extends into the plane of the ramp while the ramp is being lowered and gradually folds toward the bottom of the ramp while the ramp is being raised.

In an additional embodiment left and right pulley panels disposed vertically below the floor of the vehicle are provided which are adapted to slide up and down within tracks provided for such purpose, the pulley panels having pulleys mounted thereto adjacent the top edges thereof; cables passing over the pulleys attached at one end to a fixed point on the vehicle at or below the midpoint between the floor of the vehicle and ground level and attached at the other end to the platform; platform guides attached to the left and right edges of the platform adapted to slide up and down on tracks provided for this purpose; and means for lowering and raising the pulley panels to cause the platform to traverse between the floor of the vehicle and ground level.

There are other embodiments and aspects of the invention Which are set forth more fully in the Detailed Description of the Invention.

BRIEF DESCRIPTION OF THE DRAWINGS

FIG. 5C is an elevational view of the platform drive portion of the lift operating apparatus with the lift platform in its lowered position.

FIG. 5D is an elevational view of the platform drive portion of the lift operating apparatus with the lift platform in its raised position.

FIG. 6A is an elevational view taken along line 6A—6A of FIG. 5C, of a lift platform lock in its unlocked position.

FIG. 6B is an elevational view of the lift platform lock of FIG. 6A in its locked position.

FIG. 7 is an elevational view of the lift platform as seen from the entrance to the lift area, illustrating the safety gate operating apparatus.

FIG. 8A is a bottom view of the lift platform taken along line 8A—8A of FIG. 7, showing a safety gate and its associated actuating lever with the gate in its closed position.

FIG. 8B is a bottom view of the lift platform of FIG. 8A, showing the safety gate and its associated actuating lever with the gate in its open position.

DETAILED DESCRIPTION OF THE INVENTION

Figure 1:
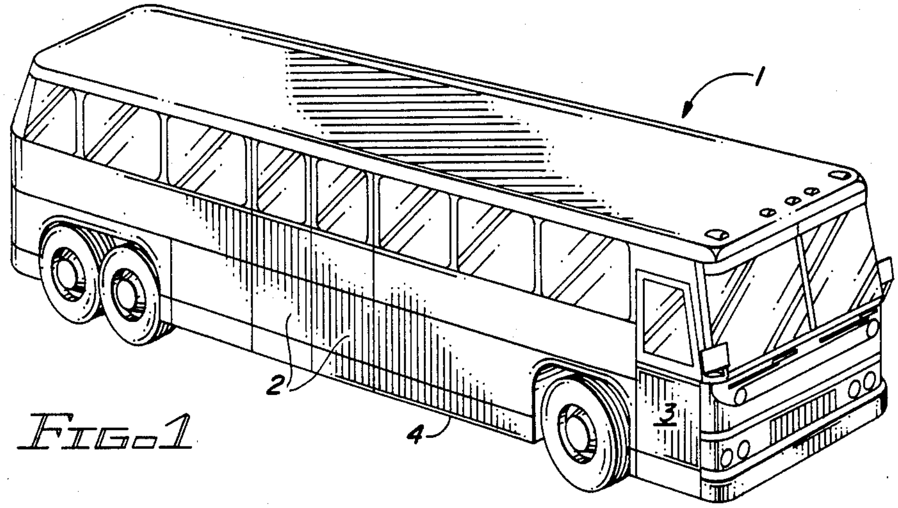
FIG. 1 is a perspective view of a bus equipped with the wheelchair lift of the present invention.
Figure 2A:
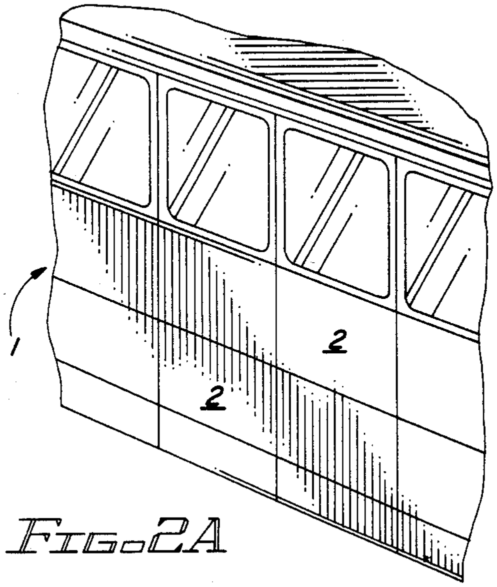
FIG. 2A is a perspective view of a portion of the side of the bus of FIG. I, showing the doors covering the entrance to the wheelchair lift in the bus.
Figure 2B:
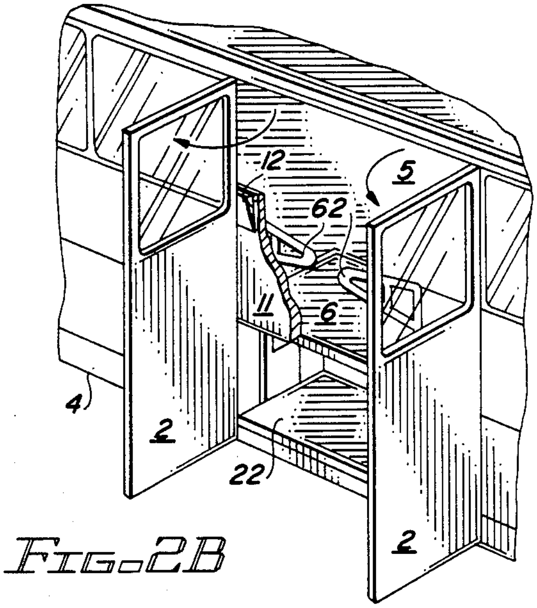
FIG. 2B is a perspective view of the entrance to the wheelchair lift in the side of the bus, with the doors open and the lift platform in its raised position level with the passenger floor of the bus, and shows the ramp in its raised position and the safety gates in their closed position.
Figure 2C:
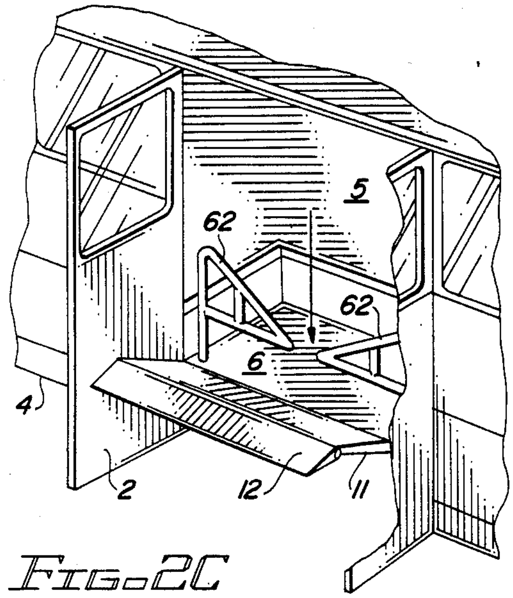
FIG. 2C is a perspective view of the entrance to the wheelchair lift showing the lift platform in an intermediate position, illustrating how the ramp swings downward from the platform during operation of the lift, and showing how the safety gates remain closed during operation of the lift.
Figure 2D:
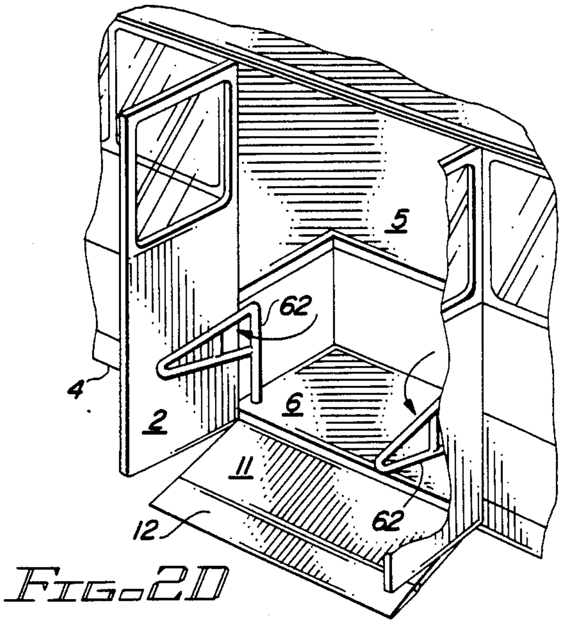
FIG. 2D is a perspective view of the entrance to the wheelchair lift showing the lift platform in its lowered position and the ramp fully deployed, and illustrating how the safety gates may be opened to permit ingress into or egress from the lift.

The elegant and unique nature of the wheelchair lift of the present invention can be appreciated by reference to the drawings. FIG. 1 depicts a bus denoted generally at 1, having lift doors 2 in its side which close over an entrance into the wheelchair lift, and an ordinary passenger door 3 which may be used by non-handicapped passengers in the usual manner. Although the present invention may be used with any van or bus-type vehicle, the vehicle shown is a bus having an undercarriage 4 and a passenger floor 5 spaced a distance above the undercarriage 4, as can be seen in FIGS. 2B through 2D.

Figure 3:
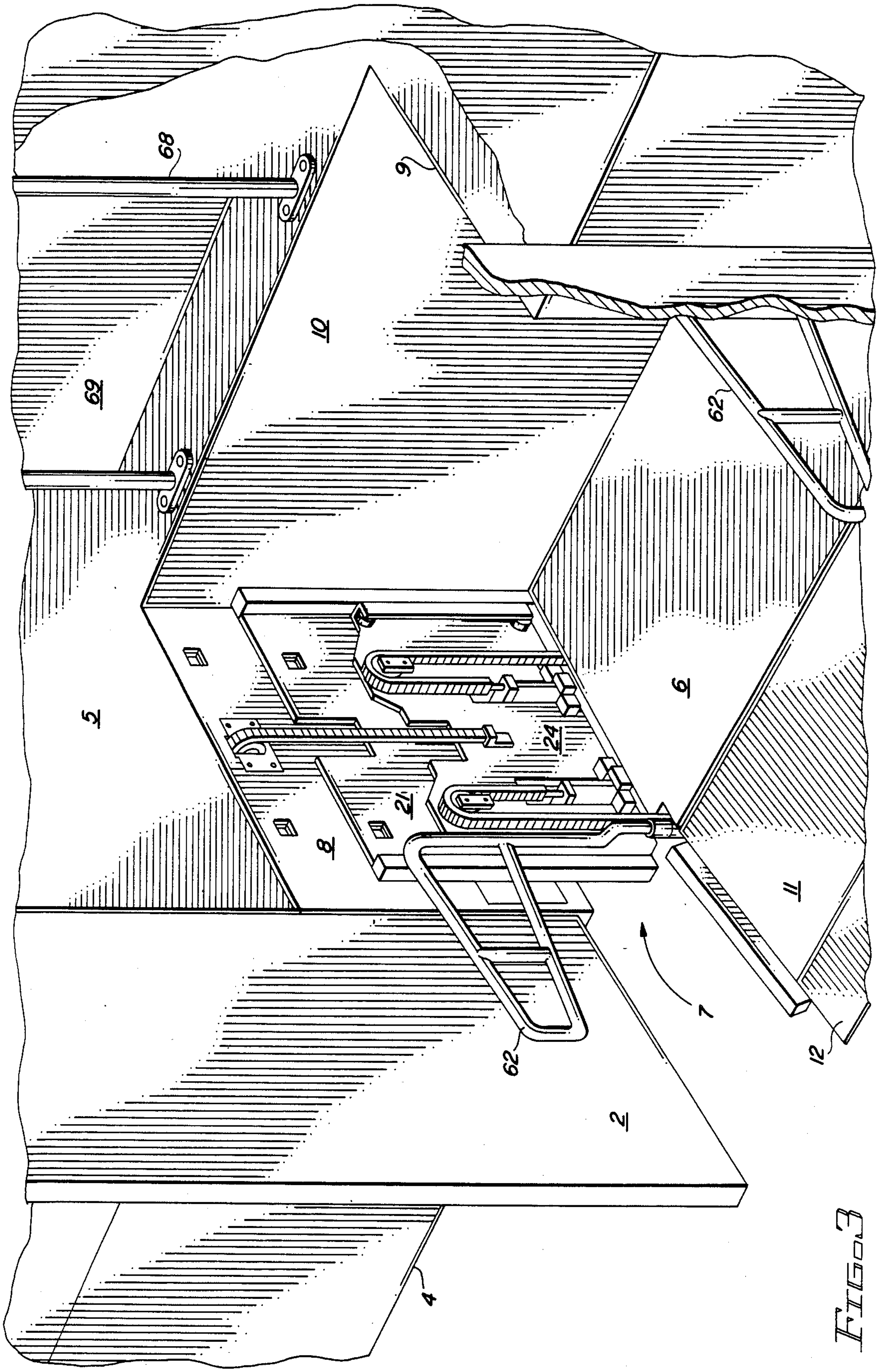
FIG. 3 is an enlarged perspective view of the lift as illustrated in FIG. 2D With the lift platform in its lowered position and the ramp fully deployed, showing details of the lift operating apparatus.

As can be seen est in FIG. 3, the wheelchair lift consists of a generally horizontal platform 6 which traverses between the passenger floor 5 defining an upper level and ground level defining a lower level, within a lift shaft denoted generally at 7. The lift shaft 7 is disposed within a cut-out area at the entrance in the side of the vehicle, between the floor 5 and the undercarriage 4, the sides of which are comprised of a left plate 8 adjacent the left edge of the lift entrance, a right plate 9 adjacent the right edge of the lift entrance, and a back plate 10 opposite the lift entrance. The shaft 7 is left open at the lift entrance. The dimensions of the shaft 7 are slightly larger than the dimensions of the platform 6, to allow the platform to move up and down within the shaft.

FIG. 4 and FIGS. 12A, 12B and 13 show how the lift platform 6 forms part of the passenger floor 5 when the platform is in its raised position. This construction avoids the problems associated with wheelchair lifts having platforms which extend outwardly of the side of a vehicle, and imparts a greater feeling of mental security and dignity to a wheelchair passenger, and provides a greater measure of safety. Further, since the platform of the present invention forms part of the floor of the vehicle, a wheelchair passenger can remain on the platform during operation of the vehicle, so as not to require additional space within the vehicle for such passenger or his wheelchair. Too, this will avoid the extra maneuvering required to use a wheelchair lift platform which must be extended outwardly of the vehicle, although this construction will allow a wheelchair passenger access to other locations within the vehicle. It is apparent from this disclosure that a vehicle can be adapted to accommodate as many wheelchair passengers as may be desired by removing ordinary passenger seats. Wheelchair securing devices should be provided in all locations in the vehicle where Wheelchairs are to be stationed, and a number of prior art wheelchair locks or straps are available for this purpose.

Figure 4:
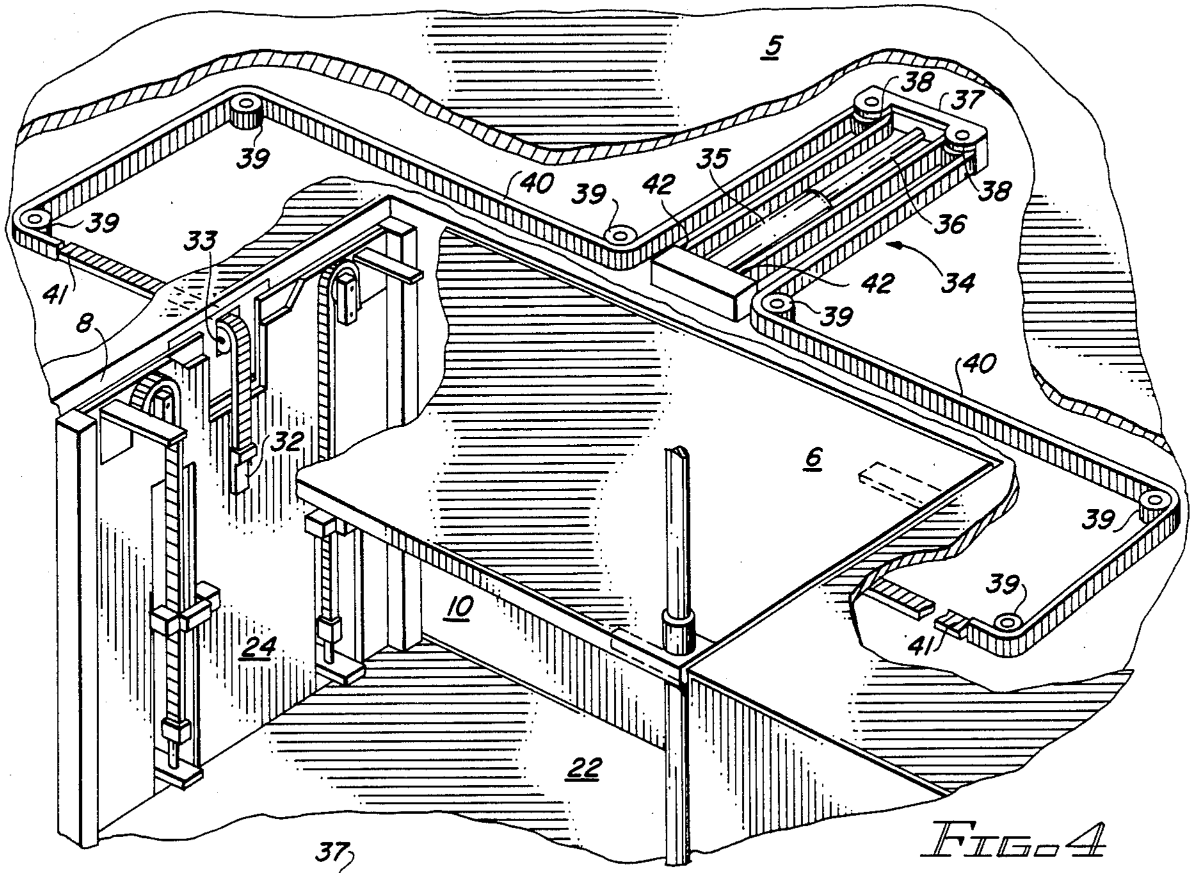
FIG. 4 is an enlarged perspective view of the lift showing the platform in its raised position level with the passenger floor of the bus, showing further details of the lift operating apparatus, and illustrating how the lift is raised or lowered by a single hydraulic cylinder.

FIG. 4 also presents an over-all view of the operating mechanism or apparatus of the wheelchair lift of the instant invention, all the components of which are desirably placed below the passenger floor 5. This secures the significant advantage of preserving a maximum amount of the vehicle's interior space, and permits optimal and flexible use of ordinary passenger seating for non-handicapped passengers, either on or adjacent to the platform area. This is a highly important factor to providers of public transportation who wish to provide service to wheelchair passengers, but who, for economic reasons, must minimize the amount of space dedicated for occasional use by wheelchair passengers. Although such are not shown, the platform could be provided with brackets for the attachment of removable passenger seats for use by non-handicapped persons when the lift is not needed for wheelchair passengers, which can be quickly and easily removed when the wheelchair lift is needed. Other advantages obtained by placing all the components of the lift operating apparatus below the floor level of the vehicle, are that such components are safely out of reach of passengers, and undesirable noises generated by such components during operation of the wheelchair lift are isolated outside the passenger compartment.

Figure 9:
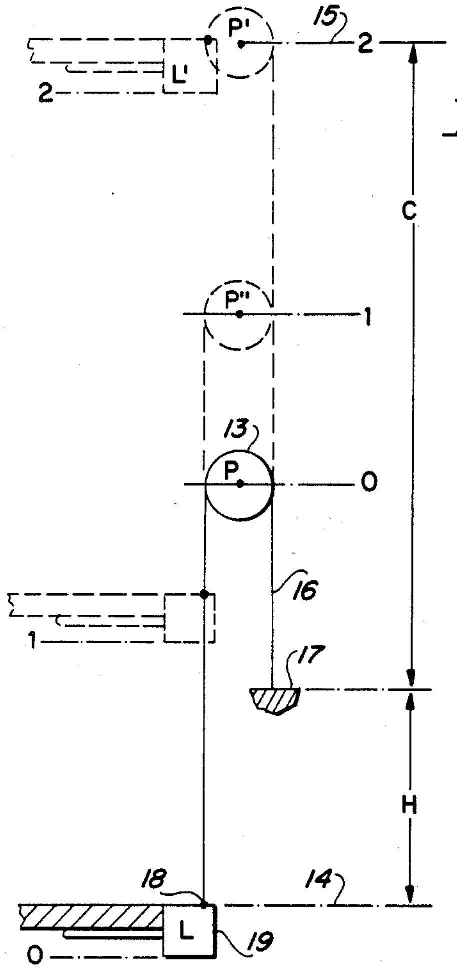
FIG. 9 is an elevational schematic view of the platform drive portion of the lift operating apparatus, illustrating the principal of operation of the platform drive.

For purposes of discussion, the lift operating apparatus for the wheelchair lift can be separated into two parts; the platform drive portion of the lift operating apparatus, and the hydraulic drive portion of the lift operating apparatus. The platform drive portion of the lift operating apparatus is best explained by referring to FIGS. 5C, 5D and FIG. 9. FIG. 9 is a schematic view of a cable and pulley apparatus illustrating the principal used in the present invention. A pulley 13 is provided, the rotational axis of which is adapted to traverse between a lower level identified at 14 and an upper level identified at 15. A cable 16 of predetermined length is attached at one end to fixed point 17, is looped or passed over the top of pulley 13, and attached a its other end to a point 18 on a load identified at 19. As the rotational axis of the pulley 13 is drawn upward towards upper level 15 and the pulley allowed to rotate, point 18 on the load 19 rises twice the distance traveled by the rotational axis of the pulley, and the ratio of travel distance of the point 18 on the load to the distance traveled by the pulley is 2:1. The length of cable required to move the point 18 from lower level 14 to upper level 15 is equal to the distance from upper level 15 to lower level 14, less the distance between the fixed point 17 and lower level 14, plus one-half the circumference of the pulley.

Referring now to FIGS. 5C and 5D, it is seen that the principal illustrated in FIG. 9 is used to unique advantage in the present invention, where the platform 6 must be able to traverse the entire distance from the passenger floor of the vehicle to ground level, while the platform drive part of the lift apparatus must fit between the passenger floor and the undercarriage of the vehicle. FIG. 5C portrays the left plate 8 of the lift shaft and the lift platform 6 in its lowered position; and FIG. 5D shows the same apparatus with the lift platform in its raised position. Although the following description specifically refers to apparatus at the left side of the lift shaft adjacent the left plate 8, it will be understood that identical apparatus is also disposed at the right side of the lift shaft, adjacent the right plate 9 (see FIG. 3).

Adjacent each of the vertical edges of the plate 8 is a cover panel track 20. A sliding cover panel 21 is provided adjacent and parallel to the left plate 8, spaced a distance in front of the plate 8 so that the cover panel 21 does not rub against the plate 8. The cover panel is of a height less that the height of the plate 8 of the lift shaft, so that it will fit entirely within the shaft when the platform is in its raised position. The cover panel is intended to traverse upward to an upper limit of travel such that its top edge is just below the passenger floor of the vehicle, and to traverse downward to a lower limit of travel such that its bottom edge is at ground level. The vertical edges of the cover panel 21 are adapted to slideably engage the tracks 20 enabling the panel 21 to slide up and down within these tracks. In the preferred embodiment, rollers (not illustrated) are provided at the vertical edges of the cover panel, adapted to engage the tracks 20, to facilitate the desired sliding action.

Referring to FIG. 4, an undercarriage cover 22 is depicted. The undercarriage cover 22 is of dimensions required to cover or close-off the lower open end of the lift shaft 7 when the platform 6 is in its raised position. The left and right edges of the undercarriage cover 22 are attached respectively to the lower edges of the left and right cover panels 21, so that as the left and right cover panels are moved to the upper limit of their travel, the undercarriage cover moves up with said panels and closes off the lower open end of the lift shaft 7, to keep dirt, snow, ice and other contaminants out of the lift shaft and to prevent fouling of the lift operating apparatus within the shaft. When the wheelchair lift is to be lowered on the other hand, the cover panels are moved downward causing the undercarriage cover to drop away from the lower open end of the lift shaft to ground level, thus providing room for the lift platform to be lowered to ground level. Although the undercarriage cover and the associated cover panels are not critical to the operation or utility of the invention, it is used in the preferred embodiment of the invention for the aforementioned reasons.

Referring again to Figs. 5C and 5D, a pair of pulley panel tracks 23 are shown mounted on the cover panel 21, adjacent the vertical edges of the cover panel. Also shown is a sliding pulley panel 24 adjacent and parallel to the cover panel 21, spaced a distance in front of the cover panel so that the pulley panel does not rub against the cover panel. The vertical edges of the pulley panel are adapted to slideably engage the pair of tracks 23 mounted on the cover panel, allowing the pulley panel to slide up and down within said tracks. In the preferred embodiment, rollers (see FIG. 3) are provided at the vertical edges of the pulley panel, adapted to engage the tracks 23, to facilitate the desired sliding action. The height of the pulley panel is less than the height of the plate 8 of the lift shaft, so that the pulley panel fits entirely within the lift shaft when the lift platform is in its raised position. The pulley panel is intended to traverse upward to an upper limit of travel such that its top edge is just below the passenger floor of the vehicle, and to traverse downward to a lower limit of travel such that its bottom edge is at ground level.

Mounted adjacent the top edge of the pulley panel 24 are a pair of platform pulleys 25, mounted to the side of the pulley panel facing the interior of the lift shaft so that the rotational axes of the platform pulleys 25 are perpendicular to the pulley panel, which also disposes the axes of the platform pulleys generally parallel to the platform. It can thus be seen that the sliding pulley panel provides means in the preferred embodiment for raising or lowering the platform pulleys 25. To make certain that the platform pulleys do not protrude above the floor level of the vehicle when the pulley panel is at the upper limit of its travel, the rotational axes of the platform pulleys should be located a distance below the top edge of the pulley panel slightly greater than the effective radii of the pulleys. This will assure that the upward travel of the rotational axes of the platform pulleys is kept to an upper limit located a distance greater than the effective radii of the pulleys below the floor of the vehicle, and that the pulleys will not extend above the vehicle's floor. The terms "effective radii" of the pulleys as used herein, mean the actual radius of each such pulley, plus the thickness of the chain looped over such pulley. As the pulley panel moves up and down, it is intended that the rotational axes of the platform pulleys traverse between an upper limit as described above, and a lower limit at the midpoint between said upper limit and ground level; i.e., that the rotational axes of the platform pulleys traverse a distance one-half the distance required of the lift platform.

It should be understood that using a pair of platform pulleys o each pulley panel is not essential to the invention, and use of a single platform pulley is contemplated by the invention. However, using two platform pulleys on each pulley panel is preferred because such construction lends greater stability to the apparatus. Moreover, other means for mounting the platform pulleys are possible and contemplated by the invention. For example, U-shaped brackets suspended from cables (not shown in the drawings) could be used to carry the pulleys at their respective axes of rotation, and the brackets could be raised or lowered by the cables attached thereto. However, it is preferable to use a sliding pulley panel which traverses up and down within a pair of tracks, which constitute part of a guide means imparting a significant level of stability to the apparatus, and provides a smoother ride to users of the wheelchair lift.

Also illustrated in FIGS. 5C and 5D are a pair of platform chains 26 which are attached at one end to corresponding fixed platform chain attachment points 27. The attachment points 27 are preferably near the undercarriage of the vehicle to allow maximum lift travel, but can be placed at any fixed or stationary location on the vehicle adjacent to the lift shaft, so long as the chain attachment points are located at or below the lower travel limit of the rotational axes of the platform pulleys. The platform chains 26 are looped or passed over the platform pulleys 25, and are attached at their other ends to platform guides 28, which in turn are affixed to the platform 6, adjacent the bottom edge thereof. Alternatively, the platform chains could be attached direct to the platform, rather than to the platform guides.

As illustrated in FIG. 5C, mounted to the side of the pulley panel 24 facing the interior of the lift shaft, are a pair of platform tracks 29, and the platform guides 28 are adapted to slide up and down on the platform tracks 29. Although not illustrated, it is equally preferred that the platform guides 28 be adapted to slide up and down on the pulley panel tracks 23, as adapted to engage the platform guides 28. The platform guides and associated tracks therefore constitute part of a guide means providing stability to the platform.

The desired platform chain length is equal to the distance from the upper travel limit of the rotational axes of the platform pulleys 25 to ground level, less the height of the fixed platform chain attachment points 27 above ground level, plus one-half the circumference of a pulley. It will be understood that belts or cables may be used in the invention as well as the preferred chains. However, belts may not have the strength or useful life required, or may stretch unduly; and since metal cables are not as flexible as chains, routing such cables over the relatively small diameter pulleys used in the invention may bend or prematurely fatigue the cables.

The height or thickness of the lift platform 6, measured from the level at which the platform chains 26 are attached to the platform, is equal to the distance from said platform chain attachment level to the floor of the vehicle when the rotational axes of the platform pulleys are at the upper limit of their travel; which will make the top surface of the platform level with the floor when the rotational axes of the platform pulleys are at the specified upper limit.

Assuming that the platform is in its lowered position as shown in FIG. 5C, as the pulley panel 24 and attached platform pulleys 25 are moved upward, since the platform chains 26 are attached to fixed platform chain attachment points 27, the platform pulleys must rotate and pull upward on the ends of the platform chains attached to the platform guides 28, causing the platform guides and attached platform to rise twice the distance as the pulley panel. If the upward movement of the pulley panel is allowed to continue until the platform chains reach the upper limit of their travel in such direction as shown in FIG. 5D, the top edge of the pulley panel 24 will be slightly below the passenger floor of the vehicle, and the top edge of the platform 6 will be level with the passenger floor of the vehicle as shown in FIG. 4.

As seen in FIG. 5C, the cover panel 21 has a pair of pins 80 attached perpendicularly to the side facing the interior of the lift shaft, adjacent the top edge thereof. As the pulley panel 24 is moved upwardly, portions of the top edge of the pulley panel comprising pin contacts 31 approach the pins 30, and as the pin contacts make contact with the pins, the pulley panel lifts the cover panel 21, and the attached undercarriage cover 22 (see FIG. 4) from ground level. The location of the pins 30 is such that the undercarriage cover will be raised from ground level to the undercarriage of the vehicle, to close-off or seal the open end of the lift shaft as the pulley panel 24 and pin contacts 31 reach the upper limits of their travel. Other means of accomplishing this result will suggest themselves to those skilled in the art in light of this disclosure.

With reference to FIG. 5D, when it is desired to lower the lift platform 6, the pulley panel 24 and attached platform pulleys 25 are lowered, allowing the ends of the platform chains 26 attached to the platform guides 28, and the platform 6, to be lowered by twice the distance as the pulley panel. At the same time, the pins 30 on the cover panel 21, which are resting on the pin contacts 31 on the pulley panel, cause the cover panel 21 and attached undercarriage cover 22 to drop the same distance as the pulley panel. As the undercarriage cover contacts ground level, the pin contacts 31 move downward away from the pine 30 as the pulley panel 24 continues downward until the bottom surface of the platform contacts the top surface of the undercarriage cover 22.

It is noted that the cover panel 21 and the pulley panel 24 are both provided with vertical slots straddling the fixed platform chain attachment points 27 as shown in FIGS. 5C and 5D, which allow the panels to move up and down without interference with the attachment points 27. Further, as shown in FIG. 2D, the above-described platform drive portion of the lift operating apparatus can be covered with protective panels, so that persons using the lift are not exposed to the pulley panels and associated apparatus. Such protective panels are mounted adjacent and parallel to the pulley panels, spaced a distance therefrom so that the moving parts of the apparatus do not rub against the protective panels. Also, there must be sufficient room in the shaft so that the platform does not scrape the protective panels during its operation, and the protective panels are provided with openings or slots adapted to allow the vertical movement of the platform guides attached to the platform.

The hydraulic drive portion of the lift operating apparatus constitutes means for raising and lowering the pulley panels 24, and hence the lift platform 6, and is best explained by reference to drawing FIGS. 4, 5A and 5B. Mounted to each of the left and right pulley panels 24 are drive chain attachments 32. A side pulley 33 is also mounted within a cut-out provided adjacent the top edges of the left plate 8 and the right plate 9 (not shown) of the lift shaft, so that the each side pulley is adjacent to and below the floor 8, and so that the axis of rotation of each side pulley is parallel to the left and right plates 8 and 9 respectively, and parallel to the floor. Also denoted generally at 34 is a hydraulic cylinder having a cylinder end 35 and a piston end 36, mounted beneath the floor 5, perpendicularly to and opposite the back plate 10 of the lift shaft, and disposed midway between the left and right plates 8 and 9 of the lift shaft. Attached at the tip of the piston end of the hydraulic cylinder is a cylinder bracket 37 to Which is mounted a pair of cylinder pulleys 38, one of such pulleys being mounted on the bracket at each of the left and right sides thereof, such that the rotational axes thereof are perpendicular to the floor 5. Also mounted below the floor 5 are a plurality of drive chain pulleys 39, such that the rotational axes thereof are perpendicular to the floor.

Left and right drive chains 40 are attached at one end to the drive chain attachments 32 on the pulley panels 24, and passed over the respective side pulleys 33. Between the side pulleys 33 and the first of the drive chain pulleys 39, each of the drive chains 40 has a horizontal to vertical chain splice 41 to change the chain from a horizontal to a vertical orientation. The drive chains 40 are then threaded around the drive chain pulleys 39 as needed to direct the drive chains to the hydraulic cylinder 34, passed over the cylinder pulleys 38 on the cylinder bracket 37, and each drive chain is attached at its other end to cylinder attachments 42 at the base of the hydraulic cylinder 34.

Although not shown, the hydraulic cylinder has two ports leading into its cylinder end which can be used alternatively as pressure and exhaust ports for hydraulic fluid, depending on whether the piston end of the hydraulic cylinder is to be extended or retracted. To these ports are attached hydraulic fluid lines, which connect the hydraulic cylinder to a hydraulic system including a hydraulic actuation valve and a powered hydraulic pump. The hydraulic system may also include appropriate pressure relief valves, hydraulic accumulators, and a back-up hand pump for use when the powered hydraulic pump is inoperable, so that the lift can still be operated in such an emergency. In the preferred embodiment, the hydraulic actuation valve is electrically actuated via an electrical switch on a lift control panel.

Figure 5A:
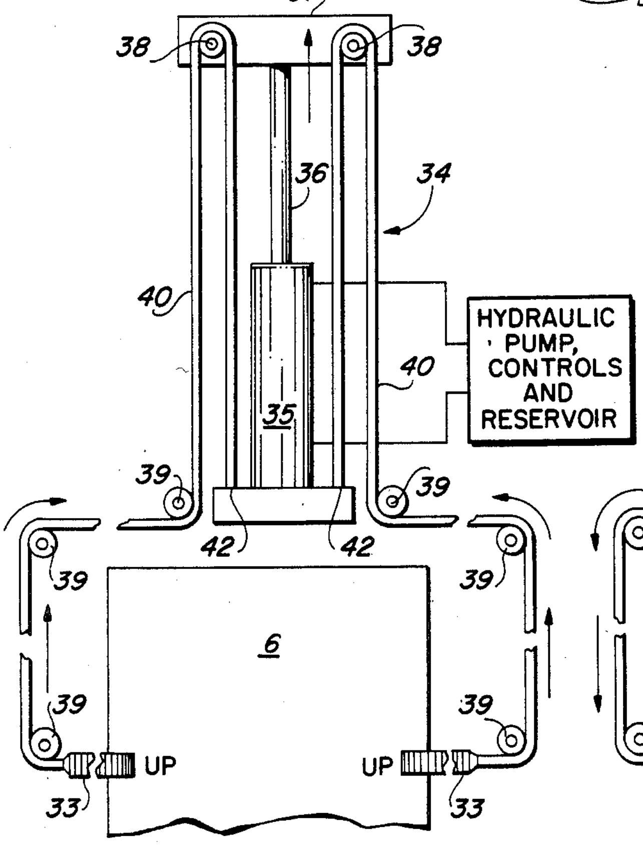
FIG. 5A is a top view of the hydraulic cylinder and drive chain apparatus with the lift platform in its raised position.
Figure 5B:
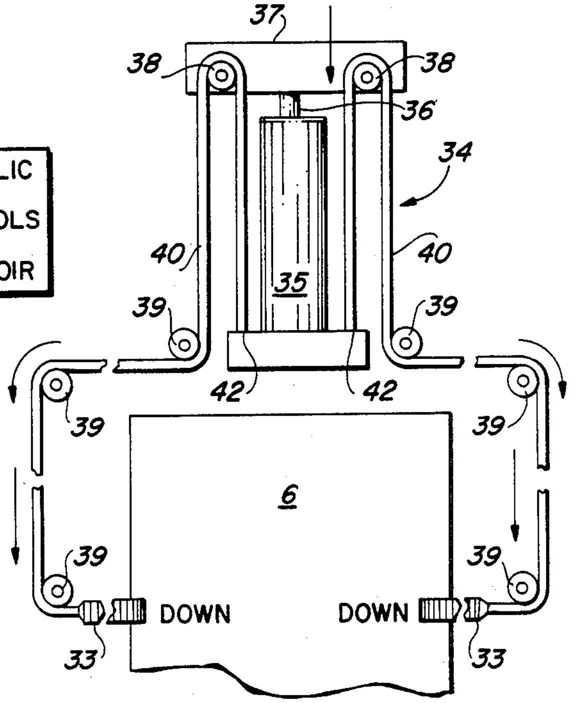
FIG. 5B is a top view of the hydraulic cylinder and drive chain apparatus with the lift platform in its lowered position.

When the lift platform is in its raised position as shown in FIGS. 4 and 5A, the piston end of the hydraulic cylinder is in its extended position, this being its normal position during operation of the vehicle. To lower the pulley panel 24, and hence to lower the lift platform 6 in the manner previously described, the piston end of the hydraulic cylinder is retracted into the cylinder end thereof, moving the attached cylinder bracket 37 and the cylinder pulleys 38 in the same direction and by the same amount. The weight of the platform pulls the drive chains outwardly from the hydraulic cylinder twice the distance traveled by the piston end of the hydraulic cylinder, in turn lowering the pulley panels 24 and the lift platform towards ground level. Conversely, when the piston end of the hydraulic cylinder is extended together with the bracket 37 and the cylinder pulleys 38, the drive chains pull on the pulley panels 24, causing the pulley panels and the lift platform to be raised towards the passenger floor of the vehicle.

The reason for mounting the hydraulic cylinder midway between the left and right plates of the lift shaft, is so that the left and right drive chains 40 will be of equal length, and to insure that the left and right drive chains are both pulled at the same rate. This construction desirably permits the use of a single hydraulic cylinder to drive the lift, and since the piston end of the hydraulic cylinder need only extend one-half the distance required to raise or lower the pulley panels, a shorter hydraulic cylinder will serve the purpose than would be required if the chains were directly connected to the piston end of the cylinder. This enables the hydraulic cylinder to be placed in tighter locations, and depending on the load rating of the hydraulic cylinder, may reduce the amount of hydraulic fluid required to actuate the cylinder, thus reducing the size of the hydraulic pump and hydraulic fluid reservoir required for the hydraulic system. In the preferred embodiment of the invention, the foregoing construction allows the power steering pump of the vehicle to be used to operate the hydraulic system, so that a separate hydraulic pump and fluid reservoir need not be provided, saving money, space and weight. Other means for driving the lift operating apparatus Will be obvious to those skilled in the art in light of this disclosure, and the use of such is contemplated by the invention.

FIGS. 6A and 6B show a platform lock 43 of the deadbolt type, in its unlocked and its locked positions respectively. Mounted perpendicularly to and behind the plate 8 on the left side of the lift shaft is a lock tube 47 adapted to slideably receive the lock 43. An air cylinder 48 is mounted at its cylinder end to air cylinder attachment 49 on the lock tube 47, and attached at its piston end to the lock 48 at lock attachment 50. When the air cylinder is actuated to extend the piston end thereof, the lock is pulled back into its unlocked position. On the other hand, when the air cylinder is activated to retract the piston end of the air cylinder, the lock 43 is pushed forward into its locked position.

As can be seen in FIG. 5C, the plate 8 on the side of the lift shaft is provided with a pair of openings 44, the cover panel 21 is provided with a pair of openings 45, and the pulley panel 24 is provided with a pair of openings 46, arranged such that when the cover panels and the pulley panels are at the upper limits of their travel, and the lift platform is level with the floor of the vehicle, the openings 44, 45 and 46 are in alignment with corresponding pairs of platform locks 43. As shown in FIG. 6B, the platform lock 43 can then engage in the aligned openings 44, 45 and 46, and the platform locks 43 can also then engage below the platform guides 28 on the platform. The foregoing apparatus thus provides means for locking the platform in its raised position, to prevent movement of the platform when the vehicle is being operated. In addition, an interlock is used in connection with the actuating valve for the air cylinder 48, to insure that the lock attempts to engage only when the platform is raised level with the floor of the vehicle. Although the preceding discussion related specifically to platform locks on the left side of the lift shaft, it will be understood that identical locks are disposed at the right side of the lift shaft. Accordingly, in the preferred embodiment of the invention, four such locks are used to lock to the platform in its raised position, two on either side of the platform.

Figure 11A:
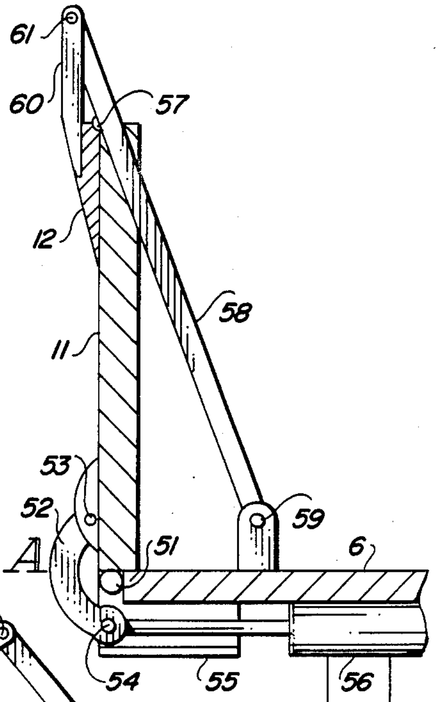
FIG. 11A is an elevational view of the platform, the ramp and its attached ramp tip in their raised position.
Figure 11B:
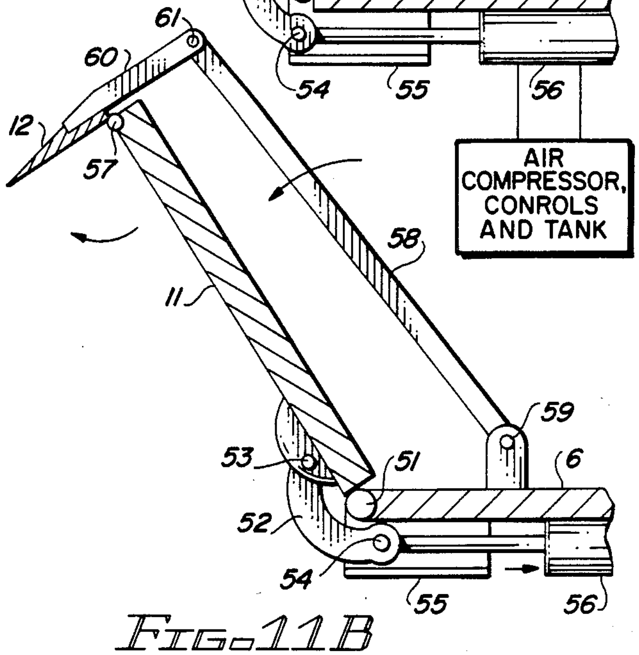
FIG 11B is an elevational view of the platform, the ramp and its attached ramp tip at an intermediate point during deployment of the ramp, showing how the ramp tip articulates as the ramp is deployed.
Figure 10:
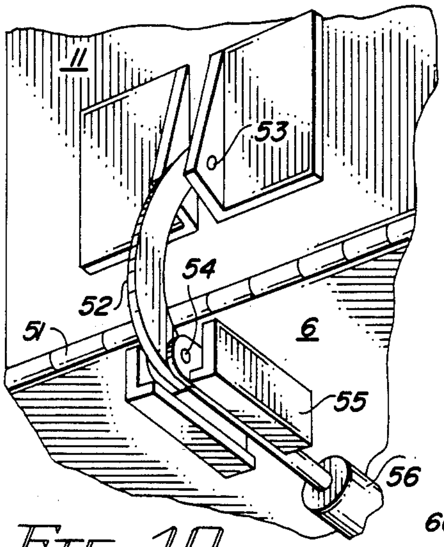
FIG. 10 is a perspective view of the lift platform and the ramp, as seen from underneath the lift platform, illustrating the means for deploying the ramp outwardly of the platform.
Figure 11C:
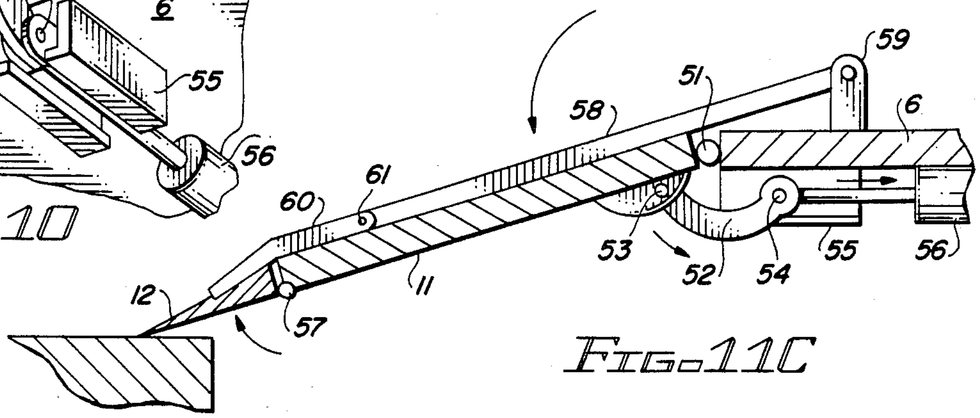
FIG. 11C is an elevational view of the platform, the ramp and its attached ramp tip in the fully deployed position, showing how the ramp and ramp tip contact ground or sidewalk level and form a bridge between the wheelchair lift platform and ground or sidewalk level, by which a wheelchair passenger may enter or leave the lift platform.

FIGS. 11A, 11B and 11C show a ramp 11 having an inner edge and an outer edge, and an associated ramp tip 12 in their raised intermediate and lowered positions respectively (See also FIGS. 2B, 2C and 2D). The inner edge of the ramp 11 is hingedly attached to the edge of the platform 6 facing the entrance to the wheelchair lift by hinge 51. A ramp link 52 is provided which is pivotally attached to the bottom of the ramp 11 at ramp link attachment 53, and the opposite end of the ramp link 52 has a sliding bearing 54 which is adapted to slideably engage within slide block 55. A ramp air cylinder 56 is affixed at its cylinder end beneath the platform 6 and the piston end of the air cylinder 56 is pivotally attached to the ramp link 52 at sliding bearing 54. The ramp link apparatus can also be seen in FIG. 10.

With the piston end of the air cylinder 56 in its extended position, the ram is held in its raised position, and is generally vertical in relation to the platform. As the piston end of the air cylinder 56 is retracted, the ramp link 52 pulls the ramp downward about the hinge 51 towards ground or sidewalk level, as shown in FIG. 11B. The ramp continues its downward swing until it is fully deployed and in contact with ground or sidewalk level as illustrated in FIG. 11C. The fully deployed ramp thus provides a bridge between ground level or sidewalk level and the platform, enabling a wheelchair passenger to either enter or leave the platform. To swing the ramp back to its raised position, the piston end of the air cylinder 56 is extended until the ramp reaches its normal stowed position. As it is desired that the ramp gradually swing up or down as the platform moves up or down, the air flow and air exhaust at the air cylinder 56 is held at a predetermined rate by appropriate valving, to control the rate at which the ramp moves in relation to the platform.

The ramp tip 12 is hingedly attached to the outer edge of the ramp 11 by hinge 57. When the ramp 11 is in its raised position as shown in FIG. 11A, the bottom of the ramp tip 12 is folded back against the bottom of the ramp in a generally vertical position. As the ramp begins to swing down towards ground level, the ramp tip 12 gradually extends outward, or articulates, until the ramp tip approaches or lies in the same plane at or in proximity to ground or sidewalk level. The ramp tip articulates in the opposite manner when the ramp is swinging upward.

The articulation of the ramp tip 12 in the preferred embodiment is imparted by a linkage comprised of tip linkage 58 which is pivotally attached to platform pivot 59 on the lift platform 6. A tip arm 60 is affixed to the ramp tip 12, and the tip arm 60 is pivotally attached to the tip linkage 58 at tip arm pivot 61. As seen in FIGS. 11B and 11C, the described linkage causes the ramp tip 12 to gradually unfold, or articulate, while the ramp is being lowered, until the ramp tip lies in the plane of the ramp, or nearly so. In the preferred embodiment, the ramp tip is designed to articulate with respect to the ramp to an angle of about 15 degrees below the plane of the ramp. As the ramp tip contacts an obstacle, such as the ground or a sidewalk, the ramp tip is pushed upwardly into the plane of the ramp, causing movement or deflection in the linkage. A sensor such as a microswitch, is placed at an appropriate place adjacent the linkage to detect when the ramp tip is deflected past the desired point, and to send a signal stopping the downward swing of the ramp and the downward movement of the lift platform. The location of the sensor in the linkage is not critical, although it is preferred to locate the sensor at a point in the linkage as far away from the ramp tip as possible, to protect the sensor from possible damage by the elements. In the preferred embodiment, the sensor is placed under the tip linkage 58 at the platform pivot 59 on the platform.

The rate at which the ramp and ramp tip extend as the platform moves downward in the preferred embodiment are such that, normally, the ramp tip contacts ground or sidewalk level before the platform contacts ground level, and the sensor tied to the ramp tip will stop further downward movement of both the ramp and the platform, leaving the platform suspended a short distance above the ground. As a safety measure, the platform also has a sensor to detect when it makes contact with the ground, which stops further downward movement of both the platform and the ramp, which leaves the ramp hanging above ground or sidewalk level. When this abnormal condition arises, i.e., when the platform contacts the ground before the ramp tip has made ground or sidewalk contact, there is presumably an unsafe drop-off at ground or sidewalk level adjacent the side of the vehicle, and an interlock is provided so that the ramp cannot be further deployed. The wheelchair lift must then be recycled into its raised position before it can be lowered again, prompting the driver of the vehicle to move the vehicle to another location before attempting to lower the wheelchair lift again.

FIGS. 7, 8A and 8B illustrate the operation of the platform safety gates 62. The safety gates 62 have attached gate posts 62A which are pivotally mounted at gate mounts 63 on the top surface of the lift platform 6 on axes perpendicular to the top surface thereof, adjacent the sides of the platform and adjacent the edge of the platform facing the lift entrance. To the ends of the gate posts 62A projecting below the top surface of the platform are attached gate levers 64. A double-acting air cylinder 65 having piston rods 66 at each of its ends is attached underneath the platform between the gate posts 62A, and the piston rods 66 of the air cylinder are pivotally attached to the gate levers 64 at lever ends 67. It can be seen that as the air cylinder 65 is actuated to extend the piston rods 66, that the levers 64 will be rotated so as to pivot the gates 62 into the open position allowing entry to the lift platform. Conversely, as the piston rods 66 are retracted, the levers 64 will be rotated so as to close the gates.

Referring to FIGS. 2B, 2C and 2D, in the preferred embodiment of the invention, the safety gates 62 remain closed until the lift platform 6 is in its lowered position and the ramp is fully deployed. This is accomplished by means of an interlock preventing actuation of the air cylinder 65 until the platform and ramp are safely and fully deployed. Also, as previously explained, where the platform contacts ground level before the ramp and ram tip make contact with ground or sidewalk level, the ramp will not deploy further and the wheelchair lift must be recycled to its raised position before the lift can be lowered again. The safety gate interlock will likewise not permit opening of the gates when such an unsafe condition occurs, until such time as the lift has been recycled and successfully lowered.

Figure 12A:
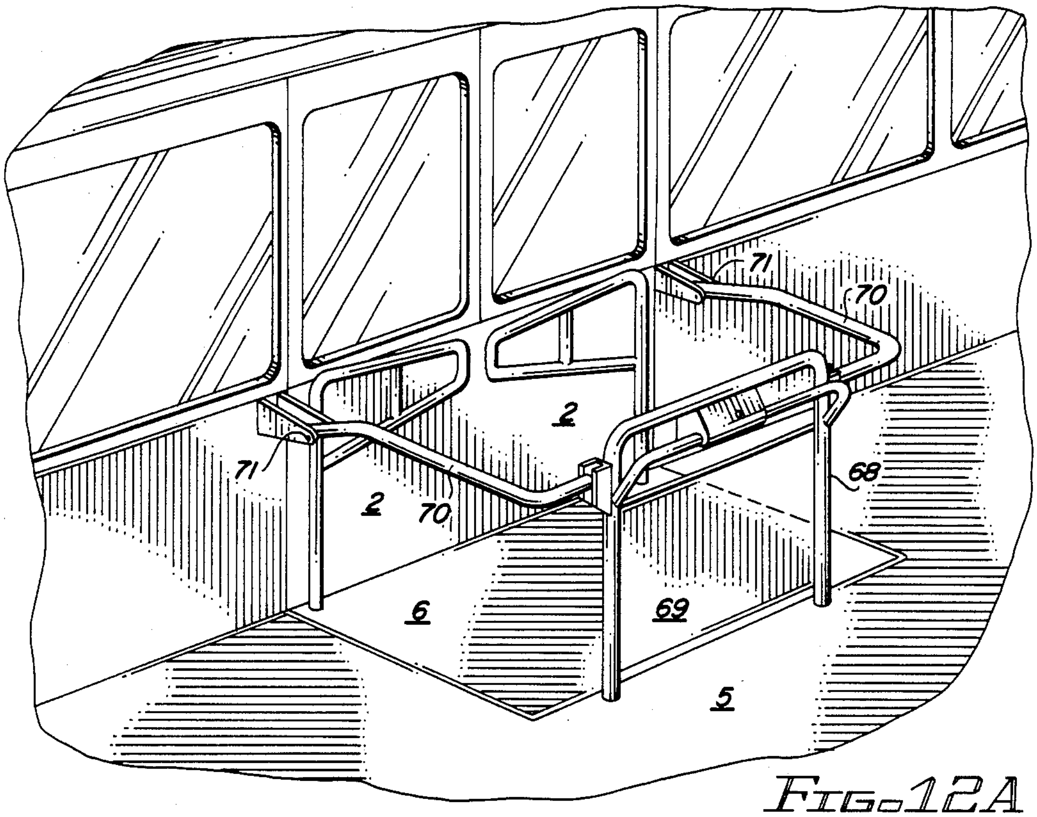
FIG. 12A is a perspective view of the interior of the bus, illustrating safety railings and barriers which can be used to protect passengers during lift operation.
Figure 12B:
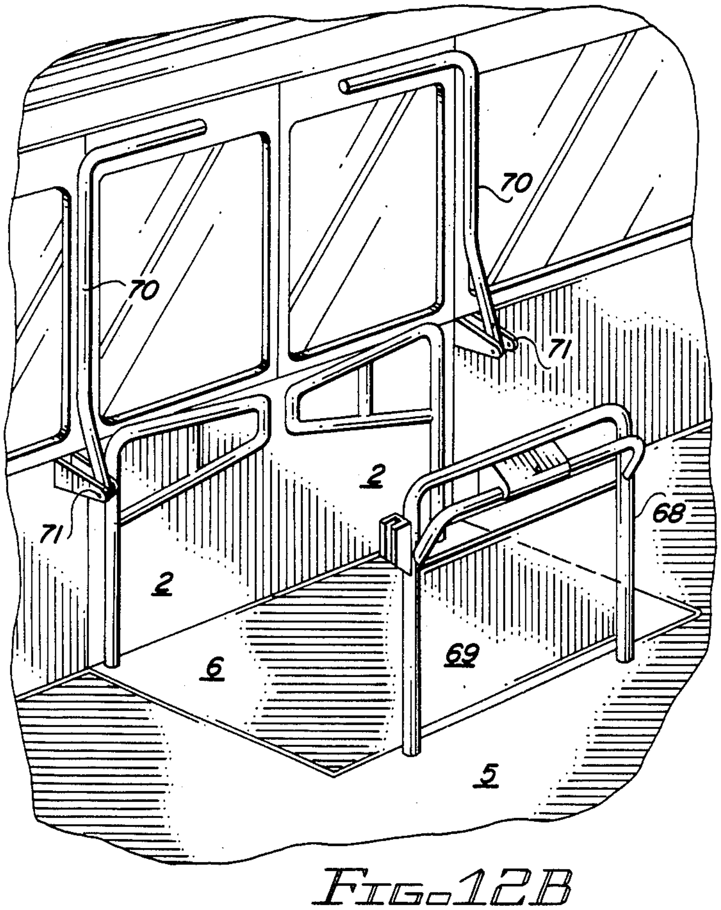
FIG. 12B is a perspective view of the interior of the bus as shown in FIG. 12A, illustrating how certain of the safety railings may be moved aside to allow a wheelchair passenger access to other places inside the bus.
Figure 13:
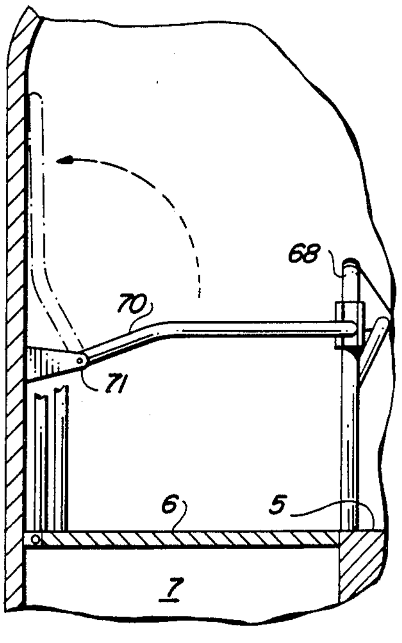
FIG. 13 is an elevational view of the interior of the bus, as seen from the front of the bus, illustrating how certain of the safety railings may be moved aside to allow a wheelchair passenger access to other places inside the bus.

FIGS. 12A, 12B and 13 illustrate safety railings and barriers that can be used in the passenger compartment of the vehicle, to protect passengers inside the vehicle against falling into the open lift shaft when the wheelchair lift is in use. Shown is a fixed railing 68 mounted to the floor of the vehicle adjacent the aisle of the vehicle, and attached barrier 69. Also depicted are movable railings 70 which are pivotally attached to the side of the vehicle at pivots 71. When the lift is not in use and the platform 6 is raised level with the passenger floor 5 inside the vehicle, the movable railings 70 may be swung up and out of the way to permit a wheelchair passenger to enter or leave the platform area in his or her wheelchair. In the preferred embodiment, interlocks are provided such that the platform cannot be lowered until the movable railings are properly secured around the platform. Other safety railings and barriers are suggested by this disclosure to those skilled in the art, and such are included in this invention.

The operation of the preferred wheelchair lift is fully automatic, and provided with numerous safety interlocks so that the operation cannot proceed to the next step until the preceding steps have all been successfully accomplished. To lower the lift, either to pick up a wheelchair passenger waiting by the side of the vehicle or to unload a wheelchair passenger inside the vehicle, the operating procedures are as follows: The driver of the vehicle stops the vehicle, places the transmission in "neutral" and sets the parking brake. If these steps are not performed, interlocks are provided so the lift master control cannot be turned on. Next, the lift master control is turned on, which locks the vehicle's transmission in "neutral" and sets the engine of the vehicle at fast idle in order to operate the hydraulic pump used by the lift. If the movable railings around the lift platform are not secured, an interlock prevents further operation of the lift, and the lift operator must secure the railings before the lift "down" switch can be engaged. Furthermore, the lift "down" switch must be held down continuously during the operation of the lift; otherwise, the lift will stop in whatever position it happens to be at the time the "down" switch is released.

Upon activation of the lift "down" switch, the platform locks disengage automatically. If the locks malfunction and do not disengage, the platform will not attempt to descend. Assuming that the locks have disengaged, the platform will begin its descent, the safety gates will remain closed, and an audible warning will be sounded and flashing lights on the outside of the lift doors turned on. The lift doors at the lift entrance then open, and if they open fully and properly, an interlock signals the ramp to begin its downward swing at a rate that under normal terrain or street conditions, the articulating ramp tip will contact ground or sidewalk level before the platform makes contact with ground level. When the ramp and ramp tip make contact with ground level under such normal conditions, further downward movement of both the platform and the ramp ceases, and an interlock then signals the safety gates to open, thus permitting a wheelchair passenger to move between the wheelchair lift and ground or sidewalk level.

To raise the wheelchair lift, either with or without a wheelchair passenger, the following steps must be followed: The lift "up" switch is first engaged, and if any of the preceding interlocks signals that a condition is not satisfied, the lift will not operate. Further, the lift "up" switch must be held down during the entire lifting cycle, and if released, the lift will stop. Assuming all interlocked conditions are satisfied, the lift platform begins to ascend upon depressing the "up" switch, and the ramp and ramp tip begin to swing upward to the vertical position. When the ramp is stowed in its vertical position, an interlock signals the lift doors to close, and if the doors close properly and the platform reaches its proper position level with the floor of the vehicle, the platform locks engage to secure the platform. If the locks do not properly engage, the vehicle's transmission cannot be taken out of neutral nor the vehicle moved until the condition is remedied.

From the foregoing disclosure, it will be appreciated that the wheelchair lift of the present invention is novel, eminently practical, and safe. Further, although the lift is particularly Valuable when used with a vehicle, it will be understood that the lift can also be used in other applications. It will also be appreciated by those skilled in the art that equivalent alternatives to the preferred embodiments can be perceived, all of which are embraced by the claims herein.

What is claimed is:

1. A wheelchair lift for a vehicle having an undercarriage, an entrance and a floor above said undercarriage with a cut-out adjacent said entrance and of sufficient dimensions to allow the passage of a wheelchair comprising:

a. a platform of predetermined thickness adapted to fit within the cut-out in the floor of said vehicle of sufficient dimensions to accommodate a wheelchair, for traversing between said floor and ground level;

b. a shaft within the side of s aid vehicle having left and right sides adjacent the left and right edges respectively of the entrance of said vehicle and having an open side at said entrance and a back side opposite the entrance of said vehicle, said shaft being disposed between the cut-out in the floor of said vehicle and the undercarriage of said vehicle and of sufficient width and depth to allow the passage of said platform therein;

c. left and right pairs of cover panel tracks adjacent the vertical edges of each of said left and right sides of said shaft;

d. left and right cover panels adjacent and parallel to each of the left and right sides of said shaft, the vertical edges of said cover panels adapted to slide up and down within said corresponding pairs of cover panel tracks, each having a plurality of pins mounted at predetermined locations perpendicularly to the side of each of said cover panels facing the interior of said shaft;

e. an undercarriage cover of sufficient dimensions to close-off the lower open end of said shaft attached between the lower edges of said left and right cover panels, for traversing between the undercarriage of said vehicle and ground level;

f. left and right pairs of pulley panel tracks mounted on each of said left and right cover panels respectively, adjacent the vertical edges of said cover panels on the side of each of said cover panels facing the interior of said shaft;

g. left and right pulley panels adjacent and parallel to each of said left and right cover panels, adapted to slide up and down within said left and right pairs of pulley panel tracks respectively, each having a plurality of pin contact placed at predetermined locations below said pins on each of said corresponding cover panels being adapted to contact the pins on said cover panels and raise or lower said cover panels and said undercarriage cover at predetermined points during the lowering or raising of said pulley panels, causing said undercarriage cover to alternately close-off or open the lower end of said shaft;

h. left and right pairs of platform pulleys each of a predetermined effective radius and each having a rotational axis, mounted to each of said left and right pulley panels respectively and adjacent the top edges thereof, such that the rotational axes of said pulleys are perpendicular to the side of each said pulley panel facing the interior of said shaft, the rotational axes of said pulleys being adapted to traverse between an upper level located a distance greater than the effective radius of each said pulley below the floor of said vehicle, and the midpoint between said upper level and ground level;

i. left and right pairs of platform tracks mounted vertically below the floor of said vehicle adjacent each of the left and right sides of said shaft;

j. left and right pairs of platform chains each of a predetermined length passing over said left and right pairs platform pulleys respectively, each said chain being attached at one end to a fixed point on said vehicle at or below the midpoint between said upper level and ground level, and each attached at its other end to said platform;

k. left and right pairs of platform guides attached to the left and right edges respectively of said platform, adapted to slide up and down on said left and right pairs of platform tracks respectively;

l. left and right side pulleys each having a rotational axis, mounted below the floor of said vehicle adjacent the left and right sides respectively of said shaft, the axes of rotation of each said side pulley being parallel to the left and right sides respectively of said shaft, and being parallel to said floor;

m. a hydraulic cylinder having a piston end and a cylinder end with a base at the end opposite the piston end, mounted beneath the floor of said vehicle perpendicularly to and opposite the back side of said shaft;

n. a cylinder bracket attached to the tip of said piston end of said hydraulic cylinder having left and right cylinder pulleys each having a rotational axis mounted therein such that their rotational axes are perpendicular to said floor;

o. a plurality of drive chain pulleys each having a rotational axis, mounted both to the left and right of said hydraulic cylinder at predetermined locations beneath the floor of said vehicle such that their rotational axes are perpendicular to said floor;

p. left and right drive chains each attached at one end to said left and right pulley panels respectively, passing over said left and right side pulleys respectively, passing over said left and right drive chain pulleys respectively, passing over the left and right cylinder pulleys respectively, and each attached at its other end to left and right cylinder attachments respectively at the base of said hydraulic cylinder; and q. means for supplying hydraulic fluid to and actuating said hydraulic cylinder, causing said drive chains to raise or lower said pulley panels and said platform.

2. A wheelchair lift for a vehicle in accordance with claim 1, further comprising a platform lock for locking said platform in its raised position level with the floor of said vehicle.

3. A wheelchair lift for a vehicle having an entrance and a floor with a cut-out adjacent said entrance of sufficient dimensions to allow the passage of a wheelchair comprising:

a. a platform having a top and a bottom surface and having left and right edges adapted to fit within the cut-out in the floor of said vehicle for traversing between said floor and ground level;

b. a pulley having its axis of rotation disposed parallel to said platform, the axis of rotation of said pulley being adapted to traverse between the floor of said vehicle and the midpoint between said floor and ground level;

c. a cable of predetermined length passing over said pulley and attached at one end to a fixed point at or below the midpoint between the floor of said vehicle and ground level, and attached at its other end to said platform;

d. means for lowering and raising said pulley at its rotational axis to cause said platform to traverse between the floor of said vehicle and ground level;

e. a ramp lying in a plane having a top side and a bottom side and having an inner edge and an outer edge, hingedly attached along its inner edge to the edge of said platform facing the entrance of said vehicle, adapted to be lowered to ground level or sidewalk level while said platform is being lowered and adapted to be raised substantially to a vertical position while said platform is being raised;

f. a ramp tip having a top side and a bottom side, hingedly attached to the outer edge of said ramp, said tip having means for gradually extending said tip into the plane of said ramp while said ramp is being lowered and means for gradually folding the bottom side of said tip towards the bottom side of said ramp while said ramp is being raised; and g. means for lowering said ramp from its raised position towards ground level or sidewalk level while said platform is being lowered, and means for raising said ramp from ground level or sidewalk level to its raised position while said platform is being raised.

4. A wheelchair lift for a vehicle in accordance with claim 3, wherein said means for lowering and raising said ramp comprises:

a. a ramp link attachment at the bottom side of said ramp;

b. a slide block attached to the bottom surface of said platform;

c. a ramp link pivotally attached to said ramp link attachment having a sliding bearing at its opposite end adapted to slideably engage said slide block;

d. an air cylinder having a cylinder end and a piston end mounted below said platform, the piston end being pivotally attached to said sliding bearing on said ramp link; and e. means for actuating said air cylinder.

5. A wheelchair lift for a vehicle in accordance with claim 3, wherein said means for extending and folding said ramp tip comprises;

a. a platform pivot mounted to the top surface of said platform;

b. a tip arm of predetermined length having first and second ends affixed at its first end to said ramp tip; and c. a tip linkage of predetermined length pivotally attached at one end to the second end of said tip arm, and pivotally attached at its other end to said platform pivot.

6. A wheelchair lift for a vehicle in accordance with claim 3, further comprising left and right safety gates having gate posts pivotally mounted to the top surface of said platform on axes perpendicular to the top surface of said platform, adjacent the edge of said platform facing the entrance of said vehicle and adjacent the left and right edges of said platform, adapted to remain closed while said platform is in its raised position and while said platform is being moved, and to open when said platform and said ramp are in their lowered positions.

7. A wheelchair lift for a vehicle having an entrance and a floor with a cut-out adjacent said entrance having left, right and back edges and of sufficient dimensions to allow the passage of a wheelchair comprising:

a. a platform of a predetermined thickness having a top surface and a bottom surface adapted to fit within the cut-out in the floor of said vehicle for traversing between said floor and ground level;

b. left and right pairs of pulley panel tracks mounted vertically below the floor of said vehicle adjacent each of the left and right edges of the cut-out in said floor;

c. left and right pulley panels disposed vertically below the floor of said vehicle, the vertical edges of said pulley panels adapted to slide up and down within said left and right pairs of pulley panel tracks respectively:

d. left and right platform pulleys each of a predetermined effective radius and having a rotational axis, mounted to said left and right pulley panels respectively adjacent the top edges thereof, such that the rotational axes of said pulleys are perpendicular to the side of each said pulley panel facing the interior of the cut-out in said floor;

e. left and right platform cables each of a predetermined length passing over said left and right platform pulleys respectively, each said cable being attached at one end to a fixed point on said vehicle at or below the midpoint between the floor of said vehicle and ground level, and each attached at its other and to said platform; and f. means for lowering and raising said left and right pulley panels to cause said platform to traverse between the floor of said vehicle and ground level.

8. A wheelchair lift for a vehicle in accordance with claim 7, wherein the rotational axes of said platform pulleys are located a distance below the top edge of said pulley panels such that the rotational axes of said pulleys traverse between an upper limit located a distance greater than the effective radii of said pulleys below the floor of said vehicle, and a lower limit at the midpoint between said upper limit and ground level, and the thickness of said platform is such that the top surface of said platform is level with said floor when the rotational axes of said pulleys are at the upper limit of their travel.

9. A wheelchair lift for a vehicle in accordance with claim 7, wherein a pair of said platform pulleys and a pair of said platform cables are provided on each of the left and right pulley panels respectively.

10. A wheelchair lift for a vehicle in accordance with claim 7 wherein the means for lowering and raising said pulley panels comprises:

a. left and right side pulleys each having a rotational axis, mounted below the floor of said vehicle adjacent the left and right edges respectively of the cut-out in said floor, the rotational axis of each said side pulley being parallel to the left and right edges respectively of said cut-out and being parallel to said floor;

b. a hydraulic cylinder having a cylinder end and a piston end mounted beneath the floor of said vehicle and parallel to said floor, and mounted perpendicularly to and opposite the back edge of the cut-out in said floor;

c. a plurality of drive cable pulleys each having a rotational axis, mounted both to the left and right of said hydraulic cylinder at predetermined locations beneath the floor of said vehicle such that their rotational axes are perpendicular to said floor;

d. left and right drive cables each attached at one end to said left and right pulley panels respectively, passing over said left and right side pulleys respectively, passing over said left and right drive cable pulleys respectively, and each attached at its other end to the piston end of said hydraulic cylinder; and e. means for actuating said hydraulic cylinder, causing said drive cables to raise or lower said pulley panels and said platform.

* * * * *